United States Patent [19]
Olinger

[11] Patent Number: 5,875,624
[45] Date of Patent: Mar. 2, 1999

[54] SICKLE APPARATUS

[76] Inventor: Harvey Olinger, 20701 Beach Blvd. #198, Huntington Beach, Calif. 92648

[21] Appl. No.: 889,022

[22] Filed: Jul. 7, 1997

Related U.S. Application Data

[63] Continuation-in-part of Ser. No. 423,713, Apr. 17, 1995, Pat. No. 5,644,904.

[51] Int. Cl.$^6$ .................................................. A01D 34/83
[52] U.S. Cl. ................................ 56/244; 56/304; 56/307
[58] Field of Search ............................. 56/292, 291, 244, 56/245, 290, 300, 307, 236, 298, 304, 313, 305; 30/387

[56] References Cited

U.S. PATENT DOCUMENTS

| | | | |
|---|---|---|---|
| 3,029,584 | 4/1962 | Johnson | 56/291 |
| 3,284,944 | 11/1966 | Hamel | 56/298 |
| 3,553,948 | 1/1971 | White | 56/307 |
| 3,641,752 | 2/1972 | Ipbach | 56/291 |

*Primary Examiner*—Terry Lee Melius
*Attorney, Agent, or Firm*—Fulwider Patton Lee & Utecht, LLP

[57] ABSTRACT

A sickle apparatus employing an endless cutter mechanism is provided wherein its modular construction allows the size of the apparatus to be readily tailored to variously sized equipment. A plastic liner is configured to engage the rollers of the roller drive chain as well as form a seal with a section of the traveling blades to reduce the incursion of debris into the mechanism. The blades have a positive angle of attack and are additionally configured to continually sweep out any debris from between sealing surfaces.

12 Claims, 4 Drawing Sheets

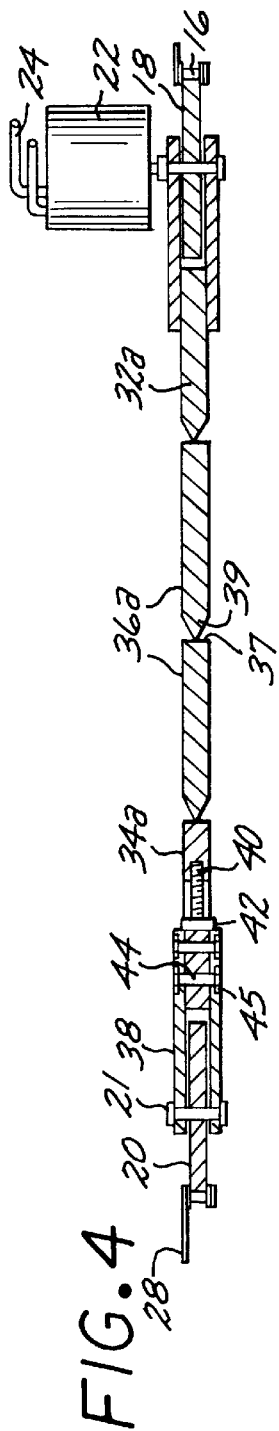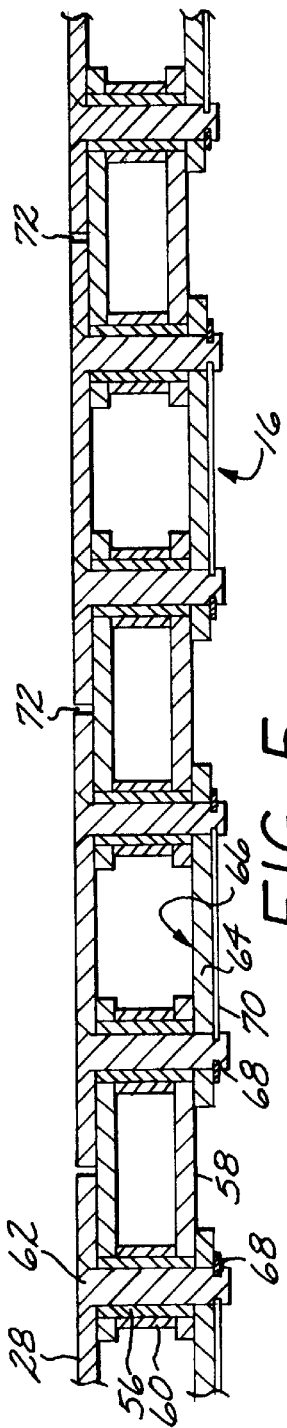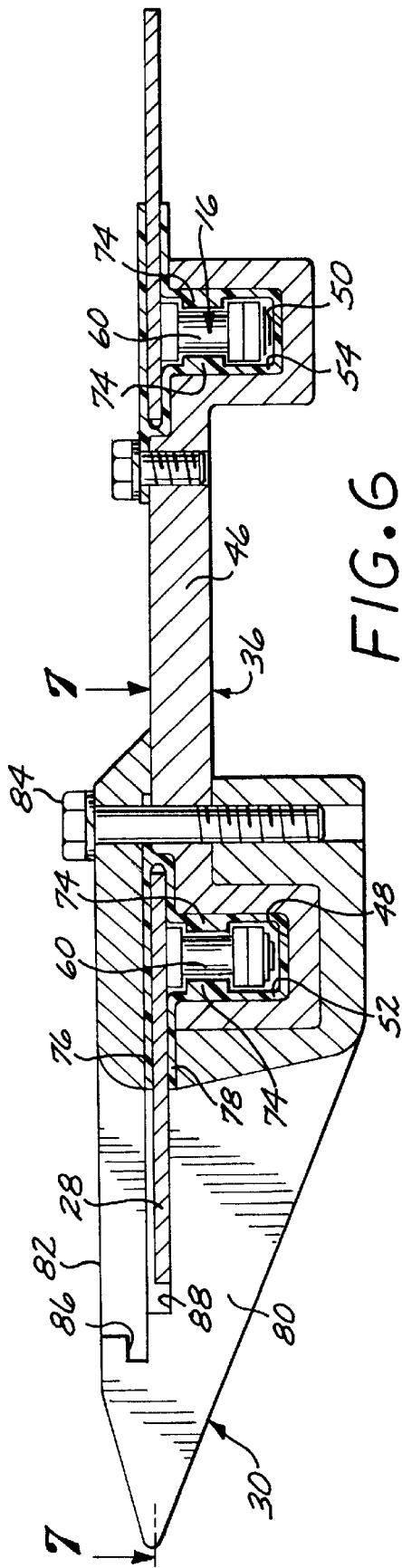

SICKLE APPARATUS

This is a continuation-in-part of application Ser. No. 08/423,713, filed on Apr. 17, 1995 now U.S. Pat. No. 5,644,904.

BACKGROUND OF THE INVENTION

The present invention generally relates to mechanized harvesting and mowing equipment used on tractors or combines and, more particularly, pertains to improvements to power sickles that employ an endless cutter type mechanism.

Endless cutters offer substantial advantages over conventional reciprocating designs. In general terms, such cutters utilize a closed loop of traveling cutting blades in concert with a series of fixed cutting blades. The closed loop is continually transported in one direction only and at constant speed past the fixed blades such that each of the traveling blades repeatedly engages each of the stationary blades in a sequential fashion to provide a continuous cutting action. The smooth operation of this type of mechanism alleviates the tremendous vibrational forces inherent in reciprocating systems which can be destructive to not only the components of the cutter mechanism itself, but to any machinery which may be subject to the vibration. Additionally, an endless mower configuration is free from the noise that results directly from the reciprocation of components in a conventional system which typically presents a considerable nuisance that can substantially wear down and impair an operator who may be subjected to such noise for an extended period of time. Finally, endless mower systems do not suffer from the power losses inherent in a reciprocating system which must repeatedly accelerate and decelerate the substantial mass associated with the reciprocating componentry.

While the various endless cutting mechanisms that have, to date, been devised do overcome the disadvantages inherent in reciprocating systems they, nonetheless, suffer from a number of shortcomings. A feature lacking in the presently known endless cutter systems is any capability for enabling the size of the cutter to be relatively easily tailored to variously sized equipment. It would be most desirable for substantially the same apparatus to be adaptable to a small tractor, as well as to a large combine without the need for redesign and by employing substantially the same components. Additionally, such apparatus should also be adaptable to the flexible platforms currently in use on many combines.

In endless cutter systems employing a drive chain to transport the traveling blades, it is essential that the position of each traveling blade is sufficiently controlled and stabilized so as to prevent wear and/or damage when traversing past fixed components. However, it is also important to minimize friction encountered by the chain in order to reduce wear and tear and minimize power losses. A satisfactory solution addressing both of these problems has not been incorporated in heretofore known endless cutter systems. A further source of friction and the consequential inefficiencies resulting therefrom is the speed at which heretofore used blade configurations are required to engage one another in order to achieve a proper cutting action. The geometry of previously used blades have employed a negative attack angle wherein the proximal ends of the cutting surfaces of each pair of blades engage prior to their distal ends. This has the tendency to push the material to be cut out from between the blades thereby requiring either increased blade speed or vehicle speed to overcome.

A further disadvantage of previously known endless cutter systems is their susceptibility to the incursion of dirt and debris. The presence of foreign material between moving parts creates undesirable drag while the abrasive nature of such materials quickly causes wear throughout the mechanism. Previously designed endless cutter mechanisms have failed to provide means for effectively excluding and/or removing dirt from between moving parts.

SUMMARY OF THE INVENTION

The sickle apparatus of the present invention overcomes the disadvantages associated with heretofore known endless cutter systems. More particularly, the device employs a modular design that is easily expandable from small tractor applications to significantly larger dimensions appropriate for use on large combines. Additionally, the blade configuration that is employed serves to reduce the speed at which the sickle must operate in order to ensure an efficient cutting action thereby reducing power and energy requirements. Furthermore, a significant reduction of internal friction is achieved by the manner in which the position of the traveling blades is controlled which further enhances the operating efficiency of the system while reducing wear and tear. Finally, the device is configured so as to reduce the incursion of dirt and additionally clear any debris that does penetrate into the device.

The apparatus of the present invention employs a cutter bar having a continuous drive chain mounted thereon which is powered by a drive sprocket and tensioned by a radially spaced idler sprocket. The distance between such sprockets determines the width of the swath that is cut and is a function of the number of identical intermediate cutter bar sections that are interposed therebetween. The drive chain is guided in its path between the sprockets in plastic lined grooves wherein the liner is configured to stabilize the drive chain to thereby control the position of the traveling blades attached thereto while significantly reducing friction. The liner is configured to engage the rollers of the drive chain to minimize lateral excursion and engages the base of the blades so as to minimize vertical excursions. The liner fully encases the chain and includes flanges that extend outwardly along the top and bottom surfaces of the base section of the blades to form a seal in an effort to minimize the incursion of dirt. The extremely small spacing between adjacent blades further limits access to dirt and the sweeping action of such blades during operation of the device precludes the accumulation of dirt and debris within the device. Use of a self-lubricating plastic as liner material substantially eliminates any maintenance requirements for such component.

A series of traveling cutting blades is attached to the drive chain, each traveling blade having a sharpened surface extending along its leading edge. Each blade comprises one half of one link in the drive chain. Pins fixedly attached to the blades reduce the number of separate components that must be handled during any repair operation while the flush mounting of such pins to the blades reduces deck height.

The traveling blades are transported through a series of blade guards that project forwardly from the cutter bar. Each guard is of two part construction wherein a lower, generally conical element receives an upper flat element to define a space therebetween through which the traveling blade passes. The guard prevents the sickle from digging into the ground and thereby maintains proper cutting height while protecting the traveling blades from damage. Each traveling blade has a positive attack angle wherein the distal end of the sharpened edge extends into the direction of travel. This serves to draw the material to be cut inwardly and thereby achieves a positive cutting action. The positive cutting action in combination with the blade speed that is achievable due to the non-reciprocating nature of the sickle's operation obviates the need for fixed blades.

These and other features and advantages of the present invention will become apparent from the following detailed description of preferred embodiments which, taken in conjunction with the accompanying drawings, illustrate by way of example the principles of the invention.

BRIEF DESCRIPTION OF THE DRAWINGS

FIG. 4 is a cross-sectional view similar to FIG. 3 of an alternative embodiment;

FIG. 5 is a greatly enlarged cross-sectional view taken along line 5—5 of FIG. 2;

FIG. 6 is a greatly enlarged cross-sectional view taken along lines 6—6 of FIG. 2.

DETAILED DESCRIPTION OF PREFERRED EMBODIMENTS

The drawings depict preferred embodiments of the sickle apparatus of the present invention. The device is attachable to a vehicle which provides power for its operation and serves to transport the device across the vegetation to be harvested.

Figure 1:
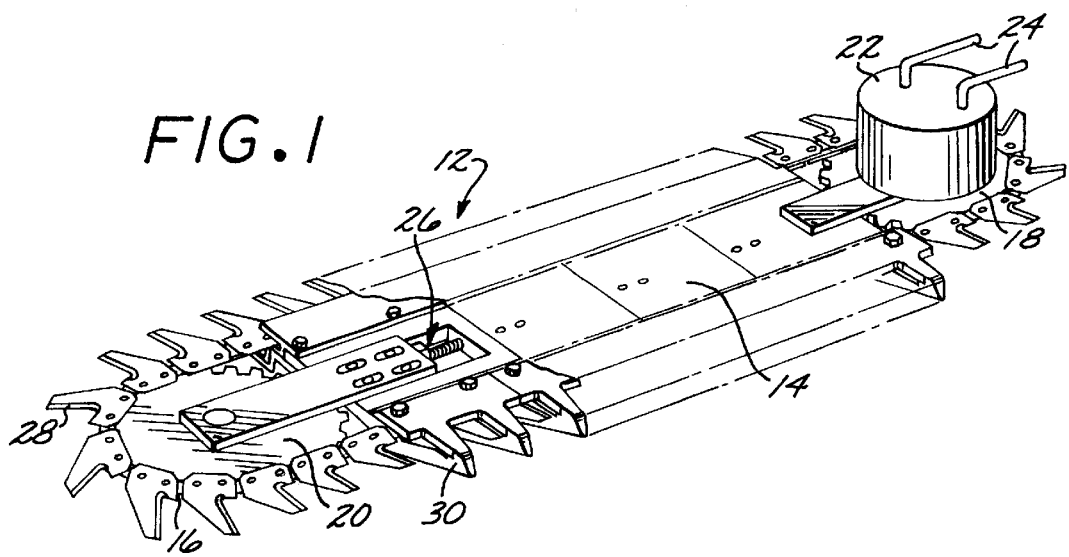
FIG. 1 is a perspective view of the sickle apparatus of the present invention.

FIG. 1 illustrates the sickle apparatus 12 of the present invention generally consisting of a cutter bar 14 having a pair of sprockets 18, 20 rotatably supported on either end. The driven sprocket 18 may be powered by any of a variety of means. The illustration semi-schematically shows a hydraulic motor 22 employed for such purpose which converts pressurized fluid supplied and returned through conduits 24 into powered rotation. Alternatively, an electric motor may be employed as could a small internal combustion engine or the device may be powered by a direct mechanical linkage extending from the tractor or combine. Idler sprocket 20 is positioned on the opposite end of the cutter bar to support a drive chain 16 wherein adjustment mechanism 26 enables the position of the idler sprocket to be adjusted relative to the driven sprocket 18 so as to tension the chain 16. A series of traveling blades 28 are attached to the drive chain and are transported about the periphery of the device upon actuation of hydraulic motor 22. A series of blade guards 30 extend from the leading edge of cutter bar 14.

Figure 2:
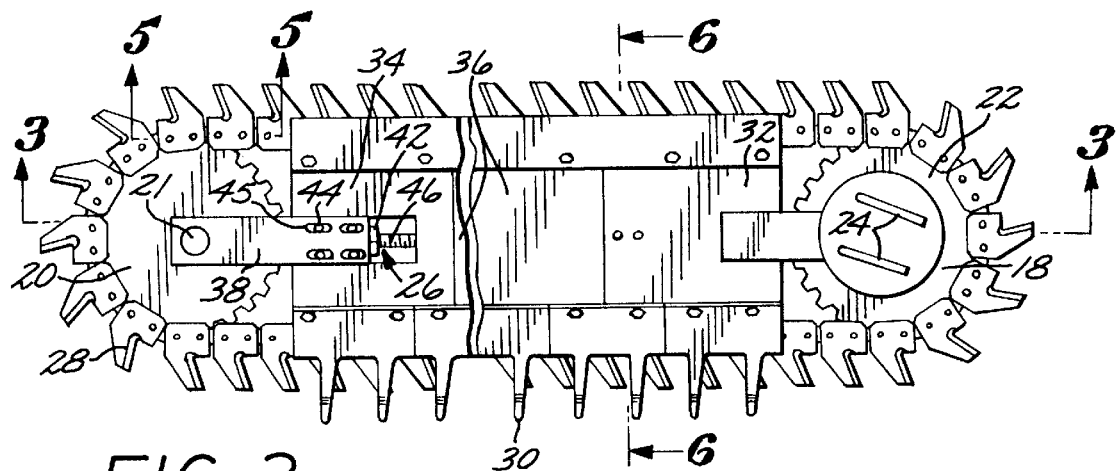
FIG. 2 is a top plan view of the apparatus shown in FIG. 1.

FIG. 2 is a top plan view of the device shown in FIG. 1. This figure more clearly illustrates the fact that the cutter bar 14 consists of a drive section 32 and a tail section 34, with a plurality of intermediate sections 36 interposed therebetween. The drive section includes a bearing set 19 for rotatably supporting drive sprocket 18, while tail section includes a bearing set 21 for rotatably supporting idler sprocket 20. Tail section 34 additionally includes adjustment mechanism 26 to allow for longitudinally shifting the position of the bearing set and hence the idler sprocket relative to the tail section. Intermediate sections 36 are each identical in configuration and are interchangeable. As is visible in FIG. 3, which is a cross-sectional view of FIG. 2 taken along lines 3—3, each section is attached to the adjacent section by a lap joint secured by a series of fasteners 33, each comprising a countersunk nut and bolt combination. FIG. 4 illustrates an alternative embodiment intended for use with a flexible platform as is currently often used on many combines. In order to accommodate the flexure of the platform, each section 36a is bolted directly to the platform (not shown) and is butted up against the adjacent section in a manner that allows for some relative movement. The particular embodiment shown in FIG. 4 employs squared off edges 37 engaged in an abutting configuration with edges of substantially reduced cross-section 39. The contact area is thereby substantially reduced to minimize resistance to any relative movement along the vertical axis resulting from the flexure of the underlying platform.

The length of the cutter bar is a direct function of the number of intermediate sections 36, 36a interposed between the drive and tail section. The use of two intermediate sections is shown for illustrative purposes only. Any number of intermediate sections may be fitted or may be deleted altogether wherein drive section 32, 32a is directly attached to tail section 34, 34a. Two support channels 48, 50 (visible in FIG. 6) extend along the edges of the drive and tail sections, as well as each intermediate section which, upon assembly of the various sections, form continuous channels extending along the leading and trailing edges of the cutter bar. This configuration allows different sizes of cutter bars to be easily manufactured without the necessity to redesign any components or the need to manufacture a special set of components for each size application. FIG. 2 also illustrates the relative spacing of the traveling blades and the blade guards. It is to be noted that the spacing between the blade guards (e.g. 3" on center) is slightly different from that of the traveling blades (e.g. 2½" on center) to achieve a continuous phase shift during operation. As a result, the timing of the cutting cycles of each blade are evenly distributed to reduce the potential for undesirable vibrations caused by load cycling.

Figure 3:
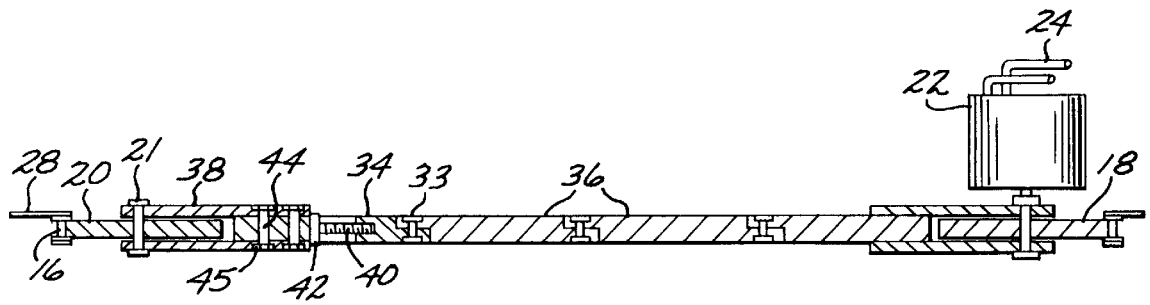
FIG. 3 is a cross-sectional view taken along lines 3—3 of FIG. 2.

Visible in FIGS. 2, 3 and 4 is the mechanism that facilitates the variable positioning of the idler sprocket 20, and, consequently, the tensioning of the chain 16. The idler sprocket 20 is supported by a bearing set 21 which, in turn, is affixed to a support housing 38 that is longitudinally slidable relative the tail section 34. A threaded shaft 40 rigidly affixed to the tail section, is slidably received within the support housing. Rotation of adjustment nut 42 which is threadedly received on shaft 40 causes the entire idler sprocket housing to shift relative the cutter bar. Once in position, set screws 44 extending through slotted holes 45 are tightened to maintain the housing and hence idler sprocket in position.

FIG. 5 illustrates the manner in which the blades are attached to the roller drive chain. Hollow pins 56 are employed in the construction of each interior link 58 while a roller 60 is disposed about each such hollow pin. Solid pins 62, securely anchored to each blade 28 such as by welding or riveting, extend through the center of each hollow pin and through an exterior link element 64. Each blade 28 thereby forms one half of each external link 66. The pin 62 is grooved 68 to receive a spring clip 70 with which the entire assembly is secured. Additionally visible in this view is the small gap 72 formed between adjacent blades. Each blade is subject to heat treatment so as to impart sufficient hardness thereto.

The cross-sectional view of FIG. 6 serves to illustrate the manner in which the chain 16 is supported within the channels 48, 50 formed in the cutter bar segments, as well as the configuration of both the traveling blades 28, as well as the fixed blade guards 30. Each cutter bar segment consists of an aluminum extrusion 46 that includes two longitudinal support channels 48, 50 arranged in a spaced relation. Each support channel is fitted with an ultra high molecular weight (UHMW) polyethylene resin liner 52, 54 which serves simultaneously to maintain the chain 16 in position and to minimize the incursion of dirt thereinto. Such UHMW plastics have a molecular weight greater than $4 \times 10^6$ g/mole are self lubricating, extrudible, inherently anti-adhesive, have extremely high impact strength, and are not affected by moisture. Such material is available under the trademark of LENNITE. The described configuration substantially eliminates wear to the chain 16, with the inclusion of bearing surfaces 74 which engage the rollers 60 of the chain. Such configuration not only serves to precisely position the chain, but also, stabilizes the position of the traveling blades. The liner additionally includes two forwardly extending flanges 76, 78 that engage the top and bottom surfaces of the traveling blades. Such configuration serves to form a seal with the base section 92 of the blades to prevent the incursion of debris thereby further reducing wear to the moving components.

Figure 8:
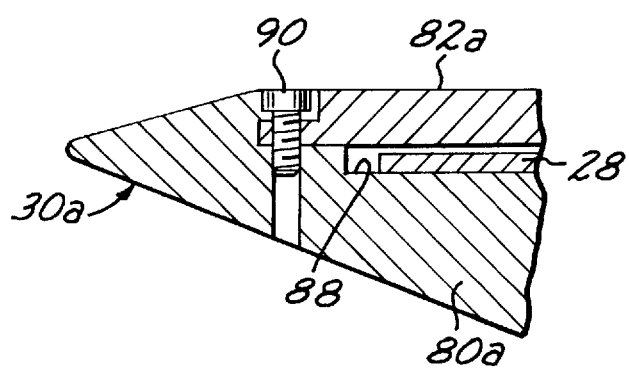
FIG. 8 is a portion of an enlarged cross-sectional view similar to FIG. 6 of an alternative embodiment.

FIG. 6 additionally illustrates in detail the configuration of each blade guard 30. The lower element 80 consists of a somewhat conically shape forging that projects forwardly from the sickle device substantially beyond the reach of the blades 28. A stamped top plate 82 is securely bolted 84 to the sickle along its proximal edge and engages a groove 86 formed in the lower element 80 at its distal end. The space 88 defined therebetween is dimensioned to allow the traveling blades to pass therethrough. FIG. 8 illustrates an alternative embodiment wherein the distal ends of the lower guard element and top plate are securely bolted 90 to one another.

Figure 7:
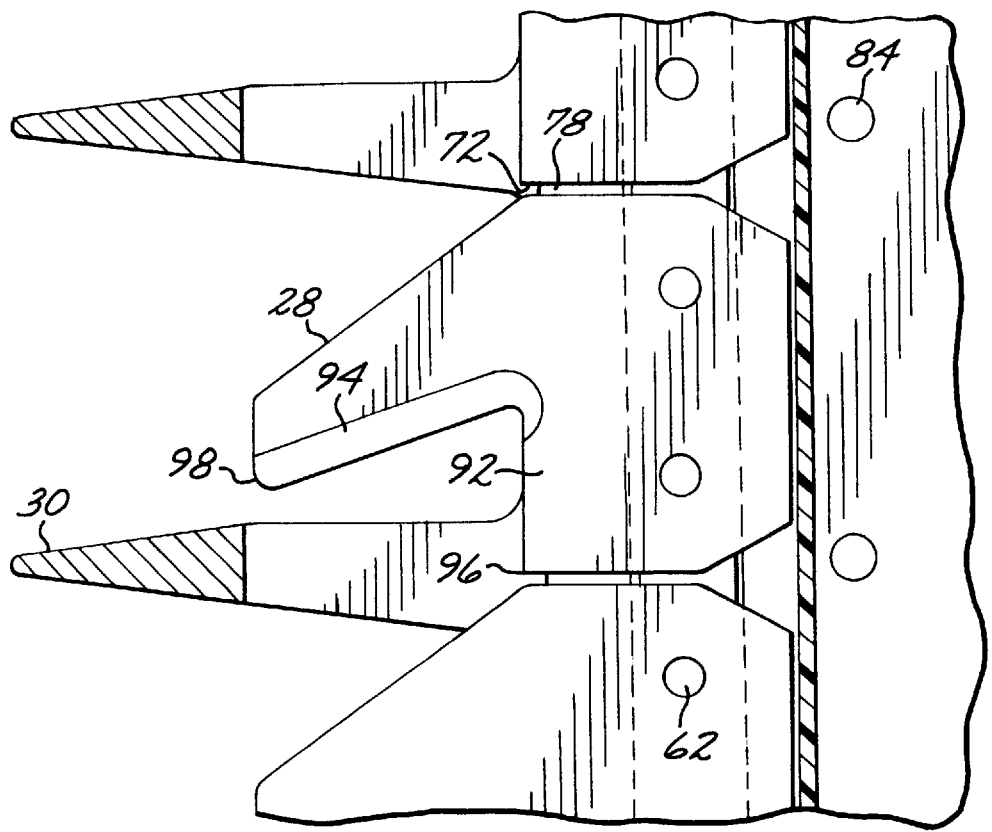
FIG. 7 is enlarged cross-sectional view taken along line 7—7 of FIG. 6.
Figure 9:
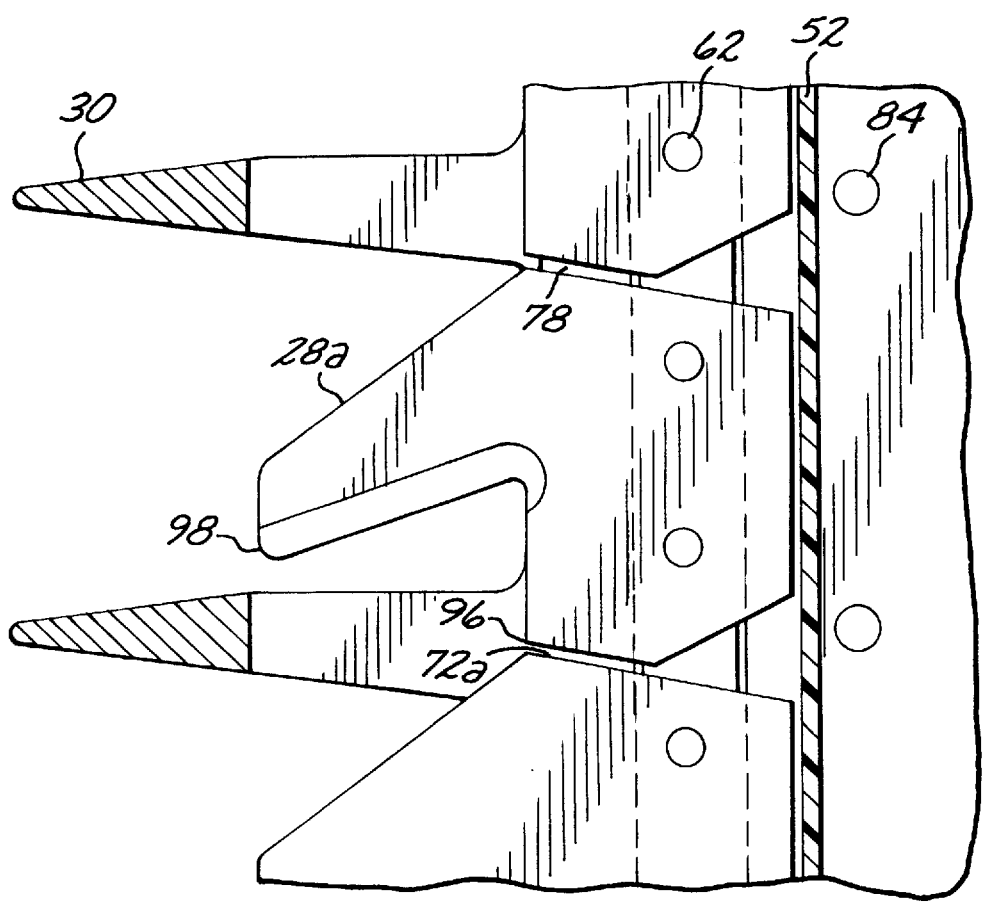
FIG. 9 is enlarged cross-sectional view similar to FIG. 7 of an alternative embodiment.

FIG. 7 illustrates features associated with the blade 28 including the large sealing surface provided by the broad base 92 section of each blade and the positive attack angle of the blade's sharpened surface 94. The forward most point 96 of the base section 92 is slightly forward of the leading point 98 of the sharpened edge 94 to effectively guide the blade into gap 88. The minimal dimension of gap 72 defined between adjacent blades 28 minimizes the incursion of debris as the cutter device is advanced through a field of vegetation. The rapid movement of the blades 28 serves to sweep away debris that penetrates the gap 72. FIG. 9 presents an alternative embodiment wherein the gap 72a defined by adjacent blades 28a is slightly angled to enhance the sweeping effect and more efficiently clear any debris that may have penetrated into the device from between flanges 76 and 78.

In operation, the modular design of the system of the present invention allows the apparatus to be readily adapted to any size equipment. Upon determination of the required width of the cutter bar 14, the number of intermediate sections 36, 36a that are necessary are determined and either assembled to one another or to a attached to a flexible platform. The appropriate length of chain 16 between the drive section 32 and the tail section 34 is then fitted about the two sprockets 18, 20. A hydraulic motor 22 for driving the drive chain is preferred, as such configuration allows the speed of the rotation of the drive chain to be readily adjusted by simply adjusting the pressure of the hydraulic fluid supplied to the hydraulic motor. Additionally, provisions may easily be incorporated in such system to detect a jam wherein a perceived spike in hydraulic pressure would serve to automatically shut the system down or, at least, to send a warning to the operator.

As drive sprocket 18 is rotated to drive the chain 16 along the cutter bar 14, and as the cutter bar is transported through the material to be harvested, each traveling blade 28 severs the material immediately upon contact or captures a clump of material which becomes severed as the traveling blades 28 pass through the blade guard 30. The UHMW plastic liner 52 prevents the chain from pivoting or twisting to thereby maintain the traveling blades 28 in position. The advanced position of each blade's base section ensures that the tip 98 of the blade 28 will be aligned with gap 88 as it is advanced therethrough. The bearing surfaces 74 formed in the liner 52 surfaces support the rollers 60 of each chain link which rotate upon contact and prevent friction therebetween. Vertical motion is controlled by the interaction of the blade base section 92 with the flanges 76, 78 of the liner 52. The disparate spacing between the traveling blades and the blade guards ensure that the timing of the blades engaging the blade guards is evenly spread out over time. This seems to more evenly distribute the loads the device is subject to thereby reduce shock loading and minimize friction.

While a particular form of the invention has been illustrated and described, it will also be apparent to those skilled in the art that various modifications can be made without departing from the spirit and scope of the invention. For instance, any power source may be utilized to rotate the drive pulley, and a variety of different blade configurations and geometries may be adapted to the system. Accordingly, it is not intended that the invention be limited except by the appended claims.

What is claimed is:

1. A sickle apparatus, comprising;
   an elongated cutter bar having a leading edge and having a groove formed therein extending along and adjacent to said leading edge;
   a continuous multi link chain transportable within said groove wherein said chain has rollers extending across each link;
   a plurality of traveling blades attached to said chain and extending outwardly from said leading edge; and
   a liner configured for receipt within said groove and for encasement of said chain wherein said liner includes opposed bearing surfaces for engaging said rollers therebetween to prevent lateral shifting of said chain and further including outwardly extending opposed flanges for engaging said blades therebetween to prevent vertical shifting of said chain and to prevent the incursion of foreign matter.

2. The sickle apparatus of claim 1 wherein each traveling blade forms a structural component of each one of said links of said chain and wherein each blade includes a broad base section and wherein base sections of adjacent blades are positioned as close to one another as possible.

3. The sickle apparatus of claim 2 wherein gaps defined by adjacent base sections are angled such that translation of said blades by said chain causes debris disposed between said opposed flanges to be swept outwardly.

4. The sickle apparatus of claim 2 wherein said blade has a sharp edge with a positive angle of attack.

5. The sickle apparatus of claim 1 further comprising a series of blade guards extending outwardly from said leading edge and wherein said leading edge is further forward than any part of said sharpened edge.

6. The sickle apparatus of claim 1 further comprising a series of blade guards extending outwardly from said leading edge configured to enable said traveling blades to pass therethrough.

7. The sickle apparatus of claim 6 wherein said blade guards are generally conical in shape.

8. The sickle apparatus of claim 7 wherein said blade guard comprise a forged lower element and a stamped top plate and wherein said traveling blade passes therebetween.

9. The sickle apparatus of claim 1 wherein said liner is formed from a self-lubricating UHMW polyurethane plastic.

10. The sickle apparatus of claim 1 wherein each of said chain links has two hollow pins extending thereacross about which are disposed said rollers.

11. The sickle apparatus of claim 10 wherein each of said blades has two solid pins rigidly affixed thereto and which extend through said hollow pins.

12. The sickle apparatus of claim 11 wherein said solid pins are flush mounted to said blades.

* * * * *